(12) United States Patent
Gould et al.

(10) Patent No.: US 7,855,682 B2
(45) Date of Patent: Dec. 21, 2010

(54) TIME SYNCHRONIZATION

(75) Inventors: Dale Martin Gould, Chelmsford (GB); Robert David Cooper, Hatfield (GB)

(73) Assignee: Selex Galileo Ltd., Basildon, Essex (GB)

( * ) Notice: Subject to any disclaimer, the term of this patent is extended or adjusted under 35 U.S.C. 154(b) by 1090 days.

(21) Appl. No.: 11/587,139

(22) PCT Filed: Jul. 5, 2006

(86) PCT No.: PCT/GB2006/050188

§ 371 (c)(1), (2), (4) Date: Oct. 20, 2006

(87) PCT Pub. No.: WO2007/012888

PCT Pub. Date: Feb. 1, 2007

(65) Prior Publication Data
US 2009/0160699 A1    Jun. 25, 2009

(30) Foreign Application Priority Data

Jul. 27, 2005   (EP)   ................... 05270033
Jul. 27, 2005   (GB)   ................... 0515300.2

(51) Int. Cl.
*G01S 1/24*   (2006.01)
(52) U.S. Cl. .................................... 342/387
(58) Field of Classification Search ................ 342/189, 342/386, 387, 410
See application file for complete search history.

(56) References Cited

U.S. PATENT DOCUMENTS 3,900,261 A   8/1975   Wingate 4,494,211 A   1/1985   Schwartz
5,303,206 A   4/1994   Bemb

FOREIGN PATENT DOCUMENTS

EP   0 733 912 A2   1/1996
EP   1 030 531 A1   2/2000

OTHER PUBLICATIONS

Kirchner, D: "Two-Way Time Transfer Via Communication Satellites" Proceedings of the IEEE, IEEE, New York, US, vol. 79, No. 7, Jul. 1, 1991, pp. 983-990, XP000264855; ISSN: 0018-9219 *Section II. "Theory"; Figure 1, pp. 984-985.
Weiss, M: "Synchronisation of bistatic radar systems" Geoscience and Remote Sensing Symposium, 2004, IGARSS '04. Proceedings. 2004 IEEE International Anchorage, AK, USA Sep. 20-24, 2004, Piscataway, NJ, USA, IEEE, Sep. 20, 2004, pp. 1750-1753, XP 010751951, ISBN: 0-7803-8742-2 *Section II. "Time Synchornisation"; p. 1750-1752; Figures 2, 5*.
European Search Report British Search Report, Sep. 20, 2006.

*Primary Examiner*—Dao L Phan
(74) *Attorney, Agent, or Firm*—Crowell & Moring LLP

(57) ABSTRACT

A transmitter of a platform is arranged to generate a transmission pulse, which is transmitted to a receiver of another platform and is also arranged to couple its transmission pulse to a digital receiver associated with its platform via an attenuator and a coupler. Another platform performs a similar task. Each digital receiver determines the time separation between its transmission pulse and a received pulse from the other platform. The determined time separation information is shared with the other platform, and each digital receiver then determines a time offset between the time at its platform and the other platform.

21 Claims, 3 Drawing Sheets

TIME SYNCHRONIZATION

BACKGROUND OF THE INVENTION

1. Field of the Invention

This invention relates to a method and apparatus for determining time differences between two or more platforms, for synchronising platforms, for determining the time of arrival of a signal at platforms for locating an emitter, and more particularly for comparing the difference in time of arrival of a signal at two or more platforms.

2. Description of Related Art

Radio Frequency (RF) emitters, such as radars have previously been located by single platforms using angle of arrival information. The platform measures the angle of arrival of an emission while logging the current position of the platform from navigational data. Another angle of arrival measurement is made from a second position. The intersection of the two angles of arrival provide the position of the emitter. However, this method has limitations due to angular resolution limits and errors in position measurements. The angular resolution limit implies that the emitter lies on a given bearing within a tolerance in azimuth, i.e. the emitter lies within an arc. With an angular measurement covering azimuth and elevation, the intersecting error pattern gives an error volume in which the emitter lies. The error volume is known relative to the platform position at the times of measurement. The logged positions may not be the actual positions of the platform due to errors in the navigational system.

As a significant amount of time elapses between the measurements of the emission angle of arrival, the emitter could move between measurements, so increasing the error in the emitter location.

To avoid such problems with platform movement, location measurement needs to be performed quickly or nearly instantaneously. Multiple geometrically-separated platforms can therefore use 2D angle of arrival information to locate the position of an emitter within the angular error of such a system.

An alternative technique has been used with multiple platforms to resolve location from Time Difference of Arrival (TDOA) measurements. A typical TDOA system uses a number of spatially separate transmitters which are synchronised in time. Each transmitter transmits an identifiable pulse chain. The time difference between the arrival of the pulse chains from the different stations enables time difference of arrival hyperboles to be calculated for each pair of stations. A portion can be calculated from two intersecting hyperboles provided the positions of the transmitters are known. The velocity of the platform during measurement can, however, affect the accuracy of the system.

Similarly (in reverse) the position of an emitter can be located using three or more receivers which are synchronised in time and located at known positions by generating hyperboles representing the difference in arrival time of a pulsed signal at pairs of receivers.

The TDOA technique provides an improved location precision at long range than angular intersect techniques, with antenna arrays that are compatible with modern jet aircraft sizes.

Moving platforms are subject to relativistic effects which make it difficult to determine position and time accurately on multiple spatially-separate airborne platforms. For TDOA techniques to be viable on moving (3D) platforms, a space and time reference system is required. While a Differential Global Positioning Satellite (DGPS) system provides positional accuracy to the order of 0.6 metres on dynamic platforms, a method for determining time differences between two or more geometrically separate platforms is required to synchronise the platforms.

Traditional time transfer techniques are used to synchronise laboratories, for example. In this case, a laboratory transmits the real local time provided by its local clock to another laboratory via a geo-stationary satellite. A counter at each laboratory measures the time difference between the time indicated by its associated local clock and the time received from the remote clock associated with the other laboratory in order to determine a time offset between local and remote times. Fixed ground stations, off-line processing and long-time constants are, however, are usually necessary to conduct this process as with long range transmissions and atmospheric variations, a long term average is required to meet desired measurement accuracies. Furthermore it is assumed that the propagation paths are varying slowly with the time frame used.

SUMMARY OF THE INVENTION

According to a first aspect of the invention there is provided a method for determining time differences between two or more platforms, the method including the steps of:

a) transmitting an initialisation signal from each platform to at least one other platform;

b) coupling the initialisation signal from each platform into a receiver on that platform;

c) receiving a received initialisation signal at the receiver on each platform from at least one platform to which an initialisation signal was transmitted;

d) measuring a time separation between the coupled transmitted initialisation signal and each received initialisation signal; and e) calculating a time offset between at least two platforms.

Preferably, steps a) and c) of the method may comprise transmitting and receiving initialisation signals directly between each platform.

Optionally, each platform may transmit an initialisation signal to and may receive a received initialisation signal from each other platform.

The transmitted initialisation signal from a platform may be differentiated from the transmitted initialisation signal of at least one other platform. For example, the initialisation signal may be transmitted at a different frequency or pulse width to distinguish it from the initialisation signal from another platform.

In a first embodiment, steps d) and e) of the method may comprise the steps of:

f) measuring the time separation, on a first platform, between the coupled transmitted initialisation signal from the first platform and a received initialisation signal from a second platform;

g) measuring the time separation, on the second platform, between a coupled transmitted initialisation signal from the second platform and a received initialisation signal from the first platform; and h) dividing the difference in the time separations measured in steps f) and g) by two.

Alternatively, in a second embodiment steps d) and e) may include the steps of:

f) recording a counter value on each platform when transmitting an initialisation signal;

g) recording a counter value on each platform when receiving a received initialisation signal; and h) for each platform, determining the difference between the counter values recorded in steps f) and g), subtracting the difference determined at one platform from the difference determined at another platform and dividing the remainder by two.

Preferably, the method may include repeating the steps f), g) and h) for each platform at least twice and averaging the results from each iteration at each platform.

According to another aspect of the present invention, there is provided a method of locating an emitter comprising the steps of the method according to any of the preceding claims, further comprising the steps of:

determining a position for at least two platforms at the time each emitter signal generated by the emitter is received at each platform;

generating a hyperboloid for each pair of platforms on which the emitter must lie; and determining the region in which the emitter must lie from intersecting hyperboloids.

Conveniently, the platform positions may be determined from differential global positioning satellite data.

According to a further aspect of the present invention, there is provided an apparatus for determining time differences between two or more platforms, including a transmitter arranged to generate and transmit an initialisation signal, a receiver arranged to receive at least one received initialisation signal, a coupler arranged to couple each initialisation signal generated by a transmitter of a platform into the receiver associated with that platform, and a processor arranged to determine a time offset between a transmitted initialisation signal and a received initialisation signal.

The transmitter may transmit initialisation signals and the receiver may receive initialisation signals directly between each platform.

Preferably the processor on each platform arranged to determine a time offset between a transmitted initialisation signal and a received initialisation signal may include:

a timer arranged to measure the time separation, on a first platform, between the coupled transmitted initialisation signal from the first platform and a received initialisation signal from a second platform;

a timer arranged to measure the time separation, on the second platform between a coupled transmitted initialisation signal from the second platform and a received initialisation signal from the first platform; and the processor of each platform being arranged to divide the difference in the time separations measured at both the first and second platform by two to give an offset value.

Alternatively, the processor of each platform arranged to determine a time offset between a transmitted initialisation signal and a received initialisation signal may include:

a recorder arranged to record a counter value on each platform when an initialisation signal is transmitted;

a recorder arranged to record a counter value on each platform when a received initialisation signal is received; and the processor of each platform is arranged to determine the difference between the counter values for a transmitted initialisation signal and a received initialisation signal recorded at that platform, to subtract the difference recorded at the platform from the difference recorded at another platform used to provide the received initialisation signal and to divide the resultant by two to give an offset value.

Preferably, the processor on each platform may be arranged to average the offset value over successive sets of transmitted and received initialisation signals.

The transmitter may include a free running pulse generator and, the pulse generator may be arranged to generate an initialisation signal in the form of a pulse.

According to a yet further aspect of the present invention, there is provided an emitter locating system for use with the method of locating an emitter described above.

According to another aspect of the present invention, there is provided a platform comprising an apparatus for determining time differences between two or more platforms or an emitter locating system as described above.

An advantage of such apparatus is that a single receiver on each platform is utilised for both spectrum surveillance and to perform determination of time differences between two or more platforms.

BRIEF DESCRIPTION OF THE DRAWINGS

The invention will now be described, by way of example only, with reference to the accompanying drawings, in which.

DETAILED DESCRIPTION OF THE INVENTION

Figure 1:
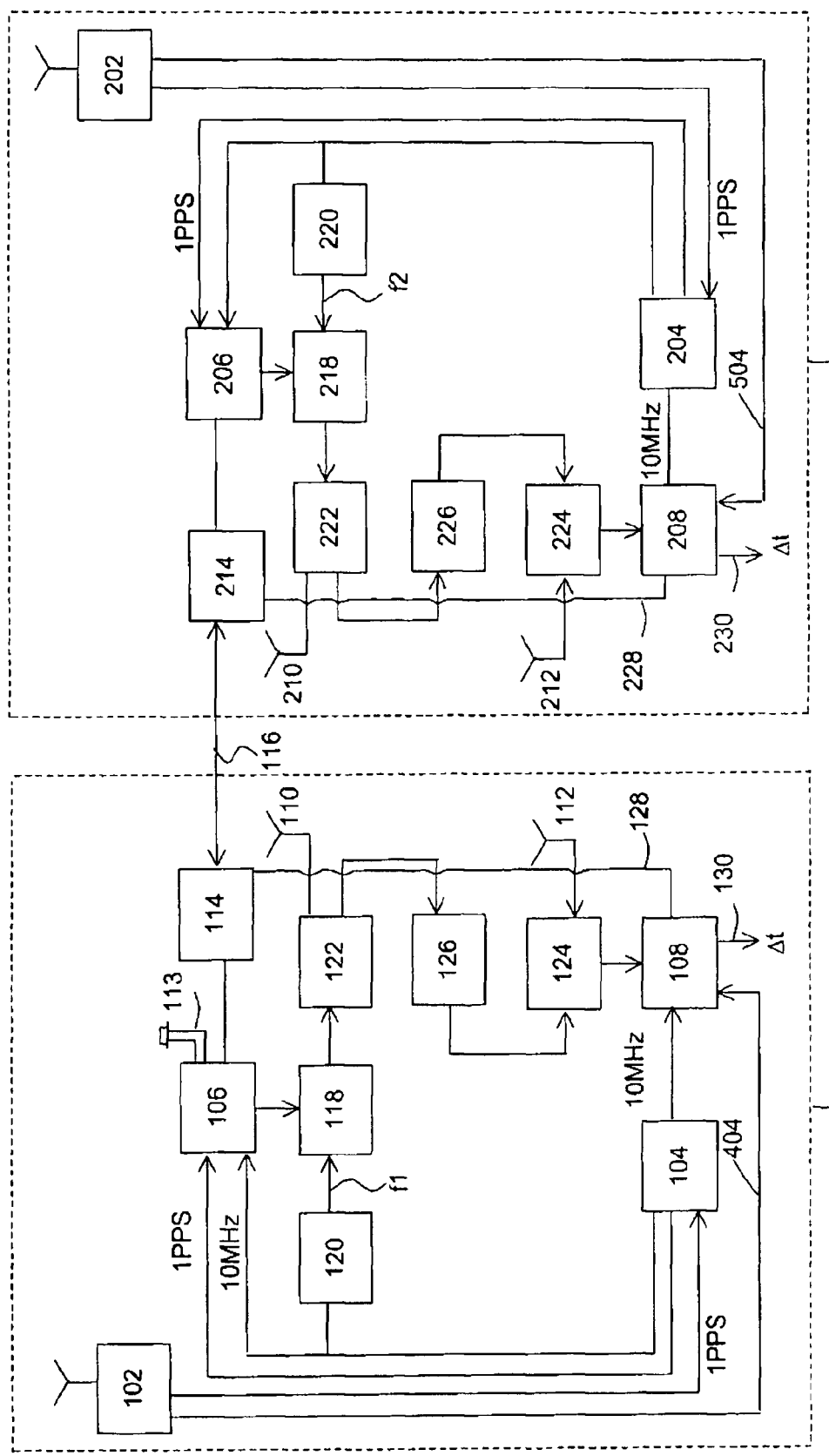
FIG. 1 is a schematic of the component parts of an apparatus for determining time differences between two or more platforms in accordance with an aspect of the invention.

FIG. 1 shows the interconnected component parts of an apparatus for determining time differences between two or more platforms in accordance with an aspect of the invention. To enable time synchronisation of two platforms 100, 200, each platform has a Differential Global Positioning Satellite (DGPS) system 102, 202; an atomic reference 104, 204, a synchronisation unit 106, 206; a digital receiver 108, 208; a transmitter 110, 210; a receiver 112, 212; and a communication controller 114, 214.

The DGPS 102 on platform 100 provides a one pulse per second 1PPS signal to its associated atomic reference 104. The atomic reference 104, such as a Rubidium standard, provides a 1PPS signal to its associated synchronisation unit 106. This 1PPS signal is synchronised to the 1PPS at the input of the atomic reference 104 and is maintained over any outages of the 1PPS from the DGPS 102.

Similarly on platform 200, the DGPS 202 provides a one pulse per second 1PPS signal to its associated atomic reference 204. The atomic reference 204, such as a Rubidium standard, provides a 1PPS signal to its associated synchronisation unit 206. This 1PPS signal is synchronised to the 1PPS at the input of the atomic reference 204 and is maintained over any outages of the 1PPS from the DGPS 202.

Figure 2:
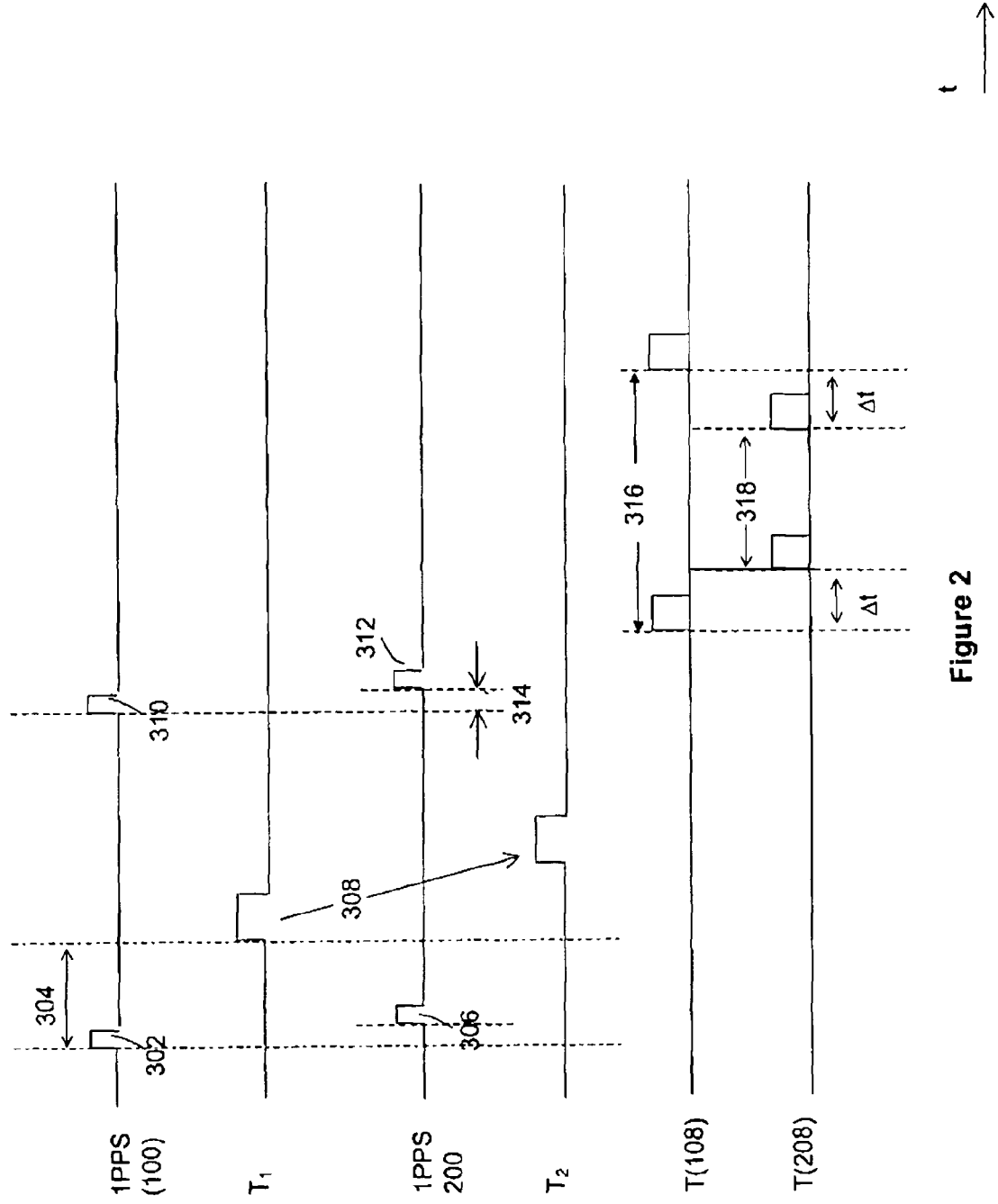
FIG. 2 illustrates the timing sequence of signal exchanges in the synchronisation system shown in FIG. 1 with time t indicated along the abscissa.

Referring to FIGS. 1 and 2, when platform 100 is requested to perform a time synchronisation by an initiate synchronisation command 113, the synchronisation unit 106 waits until the next occurrence of the 1PPS signal 302 from its associated atomic reference 104, as indicated on timeline 1PPS (100). This occurrence of the 1PPS triggers an internal timer for a short period of time 304. This short time period 304 is a safety margin, the purpose of which is to ensure that the synchronisation unit 206 on platform 200 will have received its corresponding 1PPS, as shown on timeline 1PPS (200), i.e. the safety margin covers a period greater than the expected error distribution of the 1PPS to remove any timing ambiguity.

A message 308, for example a signal or a pulse, is then sent from the synchronisation unit 106 via the communication controller 114 over a communication link 116 to instruct, via communication controller 214, the synchronisation unit 206 on platform 200 to initiate an initialisation signal, for example a pulse, on the next instance of 1PPS from atomic reference 204 on platform 200. The transmission of the message 308 can be seen on timelines $T_1$ and $T_2$, wherein $T_1$ is the timing of the transmission of the message 308 from platform 100 and timeline $T_2$ is the timing of platform 200 receiving the message 308.

On receiving the next 1PPS at time 310 from its associated atomic reference 104, the synchronisation unit 106 on platform 100 initiates an initialisation signal, for example a pulse, to gate on pulse modulator 118, thereby generating a transmission pulse at frequency F1 obtained from a frequency source 120. The transmission pulse propagates through a coupler 122 and is transmitted via an antenna of the transmitter 110. The transmission pulse propagates through a medium between platforms 100 and 200, for example atmospheric air, experiencing a propagation delay, and is received via an antenna of receiver 212. It will be noted that the transmission pulse from platform 100 becomes the received pulse at platform 200, and this received pulse is then passed via coupler 224 to digital receiver 208. The transmission pulse is also coupled from the pulse modulator 118 on platform 100 to an attenuator 126 from which it is routed via another coupler 124 to the digital receiver 108.

On platform 200, the synchronisation unit 206 receives a 1PPS signal from its associated atomic reference 204 at time 312. As can be seen from FIG. 2, the 1PPS signal of platform 200, as shown on timeline 1PPS (200) is offset from the 1PPS signal of platform 100, as shown on timeline 1PPS (100) by time separation 314. The receipt of the 1PPS signal by synchronisation unit 206 triggers the generation of an initialisation signal, for example a pulse, that is used by the pulse modulator 218 to gate frequency F2 from a frequency source 220 to a coupler 222, thereby creating a transmission pulse. The transmission pulse travels from the coupler 222 to an antenna of the transmitter 210. As the transmission pulse propagates through the medium between platforms 100 and 200, to an antenna of the receiver 112 on platform 100, the transmission pulse experiences a propagation delay. If the transmission pulse from platform 100 is near synchronous in time with the transmission pulse from platform 200, the propagation path delays will cancel by the law of reciprocity. Once received by the antenna of the receiver 112, the transmission pulse from platform 200 becomes the received pulse at platform 100, and the received pulse is routed via coupler 124 to the digital receiver 108. The transmission pulse generated by the pulse modulator 218 on platform 200 is also coupled to attenuator 226 and passed via coupler 224 to the digital receiver 208 on platform 200.

Accordingly, the datastream at digital receiver 108, see timeline T (108) of FIG. 2, contains a transmission pulse originating from platform 100 and a received pulse originating from platform 200, with a time separation 316. The datastream at digital receiver 208, see timeline T (208) of FIG. 2, contains a transmission pulse originating from platform 200 and a received pulse originating from platform 100, with a time separation 318. High speed sampling at the digital receivers 108, 208 is used to measure each time separation 316, 318.

Time separation 316 is conveyed from digital receiver 108 of platform 100, to digital receiver 208 of platform 200, via link 128 with the communication controller 114, and communication link 116 to the communication controller 214 of platform 200 and via link 228 to the digital receiver 208. Similarly, time separation 318 is conveyed from digital receiver 208 of platform 200, to digital receiver 108 of platform 100, via link 228 with the communication controller 214, and communication link 116 to the communication controller 114 of platform 100 and via link 128 to the digital receiver 108.

By assuming that the time taken for a transmission pulse to propagate from platform 100 to platform 200 is the same as that taken for a transmission pulse to propagate from platform 200 to platform 100, the time offset $\Delta t$ between platforms 100, 200 can be calculated at each platform 100, 200 by dividing the difference of time separations 316 and 318 by two. The platforms 100, 200 can then be synchronised using the result $\Delta t$.

A processed output of the resultant time offset $\Delta t$ is provided on outputs 130 and 230 for platforms 100 and 200, respectively.

In this manner, each platform 100, 200 does not need to know the actual time at each other platform 100, 200, only the time separations 316, 318 between transmission pulses and received pulses in order to determine time offset $\Delta t$. Accordingly, message exchanges between platforms 100, 200 are reduced. Although this embodiment is described using transmission and received pulses, it will be understood that other forms of signals can be used to mark the time of transmission and time of reception of such signals in order to determine time separations 316 and 318.

Furthermore, recorded time offsets $\Delta t$ between platforms 100 and 200 can be retained and averaged over a number of iterations to provide an average of the time offset $\Delta t$.

It will be understood that platform 200 can also have an initiate synchronisation command similar to initiate synchronisation command 113 of platform 100, to instigate time synchronisation.

Figure 3:
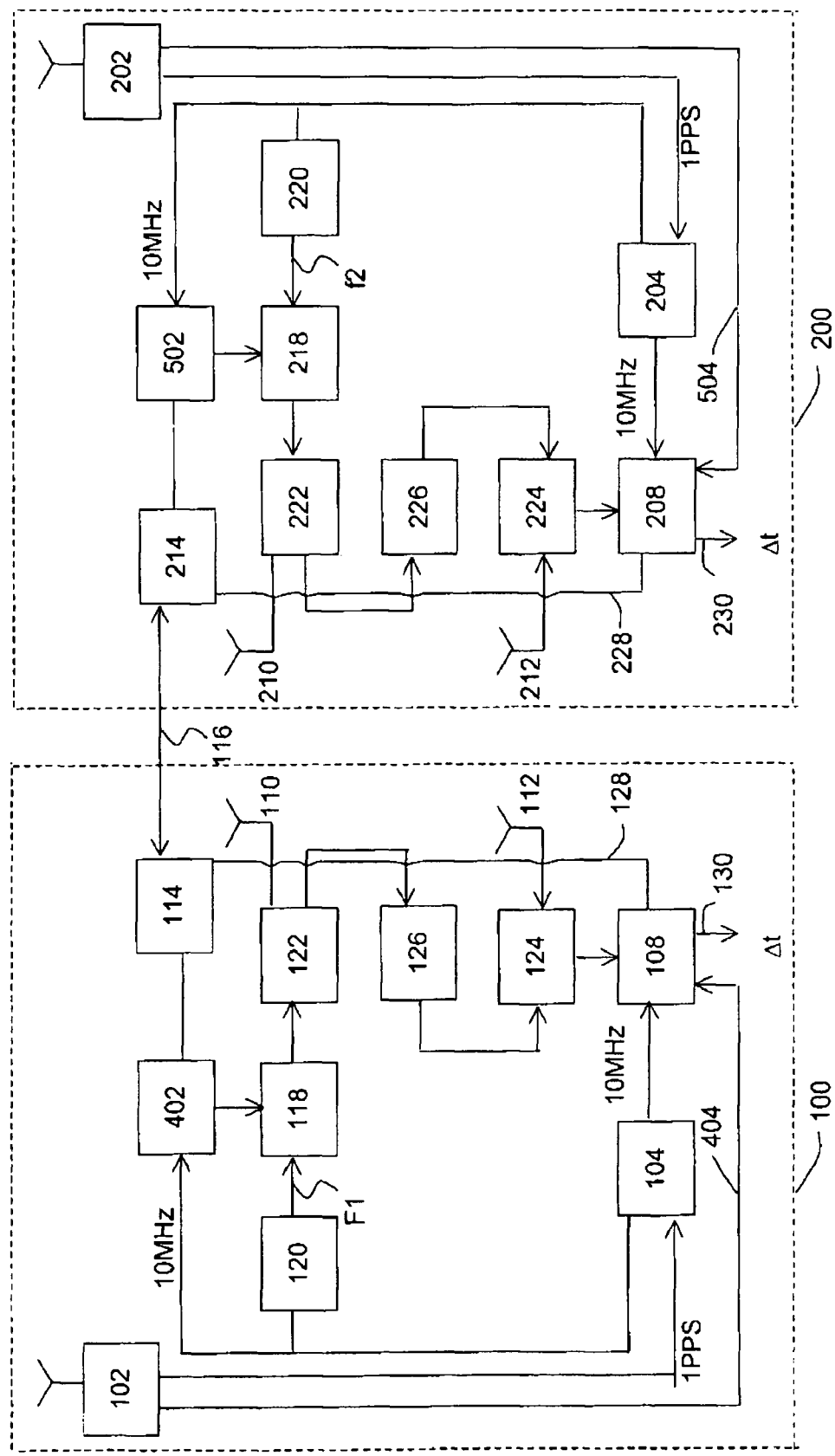
FIG. 3 shows an alternative apparatus for determining time differences between two or more platforms in accordance with another embodiment of an aspect of the invention.

FIG. 3 shows an alternative apparatus for determining time differences between two or more platforms in accordance with an alternative embodiment of the invention, wherein like references have been used to indicate similar features to those described with reference to FIG. 1. The synchronisation units 106, 206 of the embodiment shown in FIG. 1 are replaced with pulse repetition interval (PRI) generators 402, 502. The PRI generators 402, 502 drive the pulse modulators 118, 218 on the platforms 100, 200. A continuous stream of transmission pulses is embedded in each digital receiver 108, 208 on each platform and is received from each other platform 100, 200.

Positional and time data is provided by the DGPS 102, 202 to associated digital receivers 108, 208 via connections 404, 504 respectively. By using this information and a pulse repetitive interval which is considerably longer than the likely differences between the DGPS time for platforms 100, 200, appropriate pairs of pulses can be identified in the digital receivers 108, 208 for time separations 316, 318, and hence for the time offset $\Delta t$ between platforms 100, 200 to be measured.

In this implementation, the time offset $\Delta t$ is determined from the difference between counter values of counter clocks associated with each digital receiver 108, 208. When an initialisation signal is transmitted from a platform 100, 200, the value of a counter associated with that platform 100, 200 is recorded. Likewise, when a received initialisation signal is received at a platform 100, 200, the value of the counter associated with that platform 100, 200 is recorded. By determining the difference between the recorded counter values at each platform 100, 200 and knowing the time offset Δt, it is possible to calculate calibration values to compensate for the counter offset between two or more platforms 100, 200.

Furthermore, by repeating the calculation of time offset Δt on each platform 100, 200 a number of times and averaging the difference calculated at each iteration, a better resolution can be achieved than given by integer sample periods.

For example, each measurement of time offset Δt will be different due to the drift between two PRI generators 402, 502 and thus the value of time offset Δt is used to note the difference between clock counters associated with each digital receivers 108, 208, which will most likely start at different points in time. Referring to FIG. 2, the counter associated with digital receiver 108 for instance could have a value 2345 when the transmitted pulse on time line T (108) is generated and the counter associated with digital receiver 208 for instance could have a value 6796 when the received pulse on time line T (208) is detected. Furthermore, the counter associated with digital receiver 208 for instance could have a value 6789 when the transmitted pulse on line T (208) is generated and the counter associated with digital receiver 108 for instance could have a value 2358 when the received pulse on time line T (108) is detected.

Accordingly, the counter clock difference between the transmitted pulse of platform 100 and the received pulse of platform 200 on the time line T (108) will be:

2358−2345=13 and the counter clock difference between the transmitted pulse of platform 200 and the received pulse of platform 100 on the time line T (208) will be:

6789−6796=7.

Hence, thirteen times the counter clock period of the digital receiver 108 of platform 100 will give the time separation 316 between transmitted and received pulses on time line T (108) and seven times the counter clock period of the digital receiver 208 of platform 200 will give the separation 318 between the transmitted and received pulses on time line T (208).

Time separation 316 is conveyed from digital receiver 108 of platform 100, to digital receiver 208 of platform 200, via link 128 with the communication controller 114, and communication link 116 to the communication controller 214 of platform 200 and via link 228 to the digital receiver 208. Similarly, time separation 318 is conveyed from digital receiver 208 of platform 200, to digital receiver 108 of platform 100, via link 228 with the communication controller 214, and communication link 116 to the communication controller 114 of platform 100 and via link 128 to the digital receiver 108.

Therefore, a processor of each digital receiver 108, 208 can determine the time offset Δt between the transmitted pulse from the first platform 100 and the transmitted pulse from the second platform as:

$$\frac{13-7}{2} = 3.$$

Furthermore, the difference between the counters of digital receivers 100 and 200 can be determined as:

6789−2345−3=4441.

Hence, by knowing the time offset Δt, the counter of either or both digital receivers 108 and 208 can be calibrated, thereby aligning the timing at each platform 100, 200.

The PRI 402, 502 generators are free running, i.e. not locked to the atomic references 104, 204. It will be understood that to enable free running PRI generators 402, 502, the 10 MHz input to each PRI generator 402, 502 illustrated in FIG. 3 is omitted. In this case, the signals will beat through each other which improves the estimate to better than a whole number of samples and by repeating determinations of counter offset values and time offset Δt, it should be possible to produce an average calibration, for instance in the example given above, the difference between the counters of digital receivers 100 and 200 could be determined as 4441.21.

In accordance with a further embodiment of the invention there is provided an emitter locating system, comprising apparatus as shown in either FIG. 1 or FIG. 2, wherein the DGPS 102 provides positional data of platform 100 to the digital receiver 108 via connection 404 and the DGPS 202 provides positional data of platform 200 to the digital receiver 208 via connection 504.

The time difference of arrival of an emitter signal, for example an emitter pulse, at the two synchronised platforms 100 and 200 is calculated. Positional data of the platforms 100, 200 at the time the emitter signal is captured is used to generate a hyperboloid on which the emitter must lie. The use of more than two platforms 100, 200 enables multiple hyperboloids to be generated and the location of the emitter to be determined by the intersection of generated hyperboloids.

Having now described various embodiments of the invention it will be understood by the skilled person that numerous modification can be made.

The carrier frequency of the transmission pulses exchanged between two platforms 100, 200 can be the same; the distance between the platforms 100, 200 enables the transmission pulses to be distinguished from each other. However, for multiple platforms 100, 200 the use of different carrier frequencies for transmission pulses provides the ability to discriminate between platforms 100, 200. In a similar manner, the pulse widths of each platform can be different to aid determination of the platform of origin.

The atomic references 104, 204 maintain the synchronisation over a time frame which can be determined from the expected drift rate between the atomic references 104, 204 and the consequence of relativistic effects on the platforms 100, 200. Accordingly re-synchronisation of the platforms 100, 200 can be conducted by issuance of further initiate synchronisation commands 113.

It will be understood that the invention can be used with stationary or moving platforms, for example aircraft.

The invention claimed is:

1. A method for determining time differences between two or more platforms, the method including the steps of:
    a) transmitting an initialisation signal from each platform to at least one other platform;
    b) coupling the initialisation signal from each platform into a receiver on that platform;
    c) enabling the receiver associated with each platform to perform emitter location;
    d) receiving a received initialisation signal at the receiver on each platform from at least one platform to which an initialisation signal was transmitted;
    e) measuring a time separation between the coupled transmitted initialisation signal and each received initialisation signal at each receiver; and
    f) calculating a time onset between at least two platforms.

2. A method according to claim 1, wherein steps a) and c) comprise transmitting and receiving initialisation signals directly between each platform.

3. A method according to claim 1, wherein each platform transmits an initialisation signal to and receives a received initialisation signal from each other platform.

4. A method according to claim 1, wherein the transmitted initialisation signal from a platform is differentiated from the transmitted initialisation signal of at least one other platform.

5. A method according to claim 1, wherein steps d) and e) comprise the steps of:
f) measuring the time separation, on a first platform, between the coupled transmitted initialisation signal from the first platform and a received initialisation signal from a second platform;
g) measuring the time separation, on the second platform between a coupled transmitted initialisation signal from the second platform and a received initialisation signal from the first platform; and
h) dividing the difference in the time separations measured in steps f) and g) by two.

6. A method according to claim 1, where steps d) and e) include the steps of:
f) recording a counter value on each platform when transmitting an initialisation signal;
g) recording a counter value on each platform when receiving a received initialisation signal; and
h) for each platform, determining the difference between the counter values recorded in steps f) and g), subtracting the difference determined at one platform from the difference determined at another platform and dividing the remainder by two.

7. A method according to claim 5, including repeating steps f), g) and h) for each platform at least twice and averaging the results from each iteration at each platform.

8. A method of locating an emitter comprising the steps of the method according to any preceding claim, further comprising the steps of:
determining a position for at least two platforms at the time each emitter signal generated by the emitter is received at each platform;
generating a hyperboloid for each pair of platforms on which the emitter must lie; and
determining the region in which the emitter must lie from intersecting hyperboloids.

9. A method according to claim 8, wherein the platform positions are determined from differential global positioning satellite data.

10. An apparatus for determining time differences between two or more platforms comprising:
a transmitter arranged to generate and transmit an initialisation signal,
a receiver arranged to receive at least one received initialisation signal,
a coupler arranged to couple each initialisation signal generated by a transmitter of a platform into the receiver associated with that platform, and
a processor arranged to determine a time offset between a transmitted initialisation signal and a received initialisation signal,
wherein the receiver associated with each platform is operable to locate emitters of a predetermined frequency signal.

11. An apparatus according to claim 10, wherein the transmitter transmits initialisation signals and the receiver receives initialisation signals directly between each platform.

12. An apparatus according to claim 10, wherein the processor of each platform arranged to determine a time onset between a transmitted initialisation signal and a received initialisation signal includes:
a timer arranged to measure the time separation, on a first platform, between the coupled transmitted initialisation signal from the first platform and a received initialisation signal from a second platform;
a timer arranged to measure the time separation, on the second platform between a coupled transmitted initialisation signal from the second platform and a received initialisation signal from the first platform; and wherein
the processor of each platform being arranged to divide the difference in the time separations measured at both the first and second platform by two to give an offset value.

13. An apparatus according to claim 10, wherein the processor of each platform arranged to determine a time offset between a transmitted initialisation signal and a received initialisation signal includes:
a recorder arranged to record a counter value on each platform when an initialisation signal is transmitted;
a recorder arranged to record a counter value on each platform when a received initialisation signal is received; and wherein
the processor of each platform is arranged to determine the difference between the counter values for a transmitted initialisation signal and a received initialisation signal recorded at the platform, to subtract the difference recorded at the platform from the difference recorded at another platform used to provide the received initialisation signal and to divide the resultant by two to give an offset value.

14. An apparatus according to claim 12, wherein the processor on each platform is arranged to average the offset value over successive sets of transmitted and received initialisation signals.

15. An apparatus according to claim 13, wherein the transmitter includes a free running pulse generator and the pulse generator is arranged to generate an initialisation signal in the form of a pulse.

16. An emitter locating system for use with the method according to claim 8.

17. An emitter locating system comprising an apparatus for determining time differences between two or more platforms according to claim 10.

18. A platform having an apparatus for determining time differences between two or more platforms according to claim 10.

19. A platform having an emitter locating system claim 16.

20. A method according to claim 1, wherein at least one of the platforms is airborne.

21. An apparatus according to claim 10, wherein at least one of the platforms is airborne.

* * * * *